Oct. 26, 1926.  
F. J. WEST  
BATTERY INDICATOR  
Filed Jan. 8, 1923
1,604,210
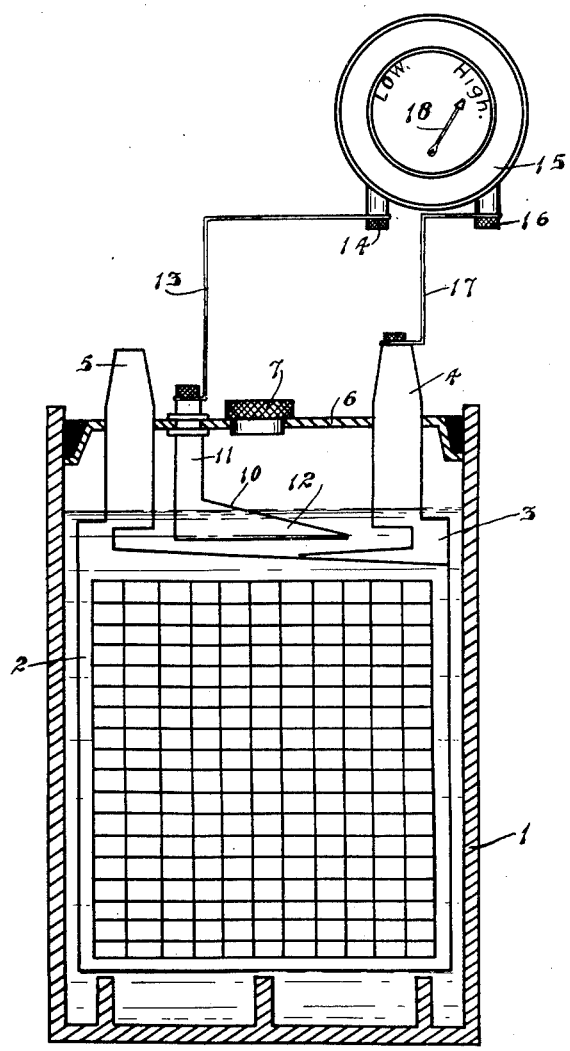
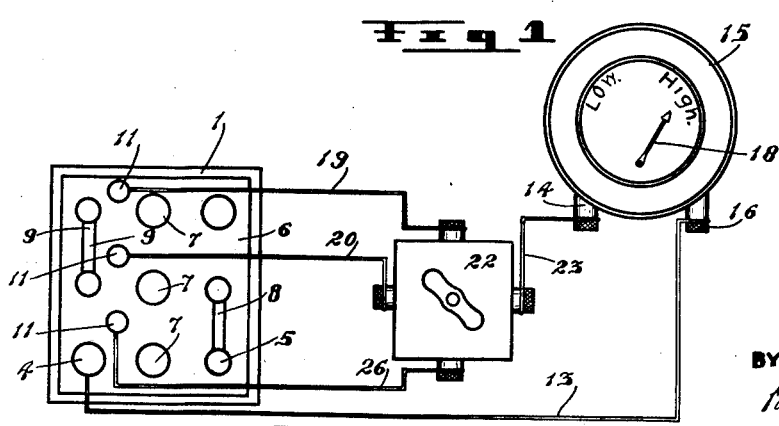
INVENTOR  
F. J. West  
BY  
ATTYS Patented Oct. 26, 1926.

1,604,210

UNITED STATES PATENT OFFICE.

FREDERICK JAMES WEST, OF WINNIPEG, MANITOBA, CANADA.

BATTERY INDICATOR.

Application filed January 8, 1923. Serial No. 611,498.

The invention relates to improvements in battery indicators, particularly for storage batteries, and an object of the invention is to provide a conveniently positioned electrical indicator which will visibly show the height of the electrolyte within the battery and thereby make it unnecessary for one to inspect his battery by the removal of the plugs to determine whether more water has to be added or not.

With the above more important objects in view the invention consists essentially in an indicating or auxiliary electrode located in the upper part of the battery and connected in circuit through a voltmeter with one of the poles or electrodes of the battery, the parts being arranged and constructed as hereinafter more particularly described and later pointed out in the appended claim, reference being had to the accompanying drawing in which:

Fig. 1 is a sectional view through a battery and showing it equipped with my invention.

Fig. 2 is a plan view of a battery and showing the wiring diagram where the invention is utilized to visually determine the height of the liquid in the several battery cells.

In the drawing like characters of reference indicate corresponding parts in the several figures.

The battery casing 1 is of the ordinary type and contains the customary positive and negative plates 2 and 3 which are immersed in the electrolyte contained within the battery. The positive and negative poles or electrodes of the battery are indicated at 4 and 5 and they protrude outwardly through the top 6 of the battery in the usual manner. The top is supplied with a removable filling plug 7 which permits of the introduction from time to time of distilled water.

Customarily one determines the height of the liquid in the battery by removing the plug 7 and looking inwardly through the plug opening. This is often a laborious operation in view of the fact that batteries are often located in rather inaccessible places.

In Figure 1 have shown a single cell battery and in Figure 2 a battery having three cells and with the cells connected in the usual manner by the connecting bars 8 and 9.

Where a single cell battery is used I install what might be termed an auxiliary or indicating plate 10 in the upper part of the battery, the plate being suitably carried by a shank or post 11 protruding through and supported by the top and presenting a foot piece 12 which preferably extends horizontally and is positioned slightly above the upper ends of the active plates 2 and 3. In the present instance the auxiliary plate is a negative one and the post thereof is connected by a wire 13 to one of the terminals 14 of a voltmeter 15, whilst the other terminal 16 of the voltmeter is connected by a wire 17 to the positive terminal 4 of the battery.

The pointer 18 of the voltmeter will operate between two positions which are indicated thereon by the words "Low" and "High."

Obviously, when the height of the electrolyte within the cell is such that any part of the auxiliary plate is submerged, there is a closed circuit through the voltmeter so that the pointer 18 thereof will point to "High," which indicates that the level of the liquid is above the active plates of the battery. On the other hand, should the height of the liquid in the cell drop below the auxiliary plate the said latter circuit through the voltmeter will be opened and the pointer thereof will indicate "Low."

By placing the voltmeter in a prominent position, such as on the dash of an automobile, one can determine immediately by observing it, the condition of the electrolyte.

In Figure 2 I have shown more or less diagrammatically the connections for a three cell battery. Here it will be observed that each cell is supplied with an auxiliary plate, the auxiliary plates being electrically connected by wires 19, 20 and 21, to a switch, indicated generally by the reference numeral 22, and a single wire 23 connects the switch with the terminal 14 of the voltmeter. The other terminal of the voltmeter is connected directly to the positive terminal 4 of the battery.

By turning the finger piece 24 of the switch one can obviously test each cell.

What I claim as my invention is:

In a storage battery, an indicator for visibly indicating whether the electrolyte in the battery is above or below a predetermined level comprising a shank protruding through and secured permanently to the cover of the battery, a horizontally extending foot piece located at the lower end of the shank and normally immersed in the elctrolyte and an electric circuit connecting the upper end of the post with one of the terminals of the battery and embodying a high resistance visible indicator.

Signed at Winnipeg, this 12th day of December, 1922.

FREDERICK JAMES WEST